US011888947B2

(12) United States Patent
Kim et al.

(10) Patent No.: US 11,888,947 B2
(45) Date of Patent: Jan. 30, 2024

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Jusin Kim, Suwon-si (KR); Hoeseo Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/736,635

(22) Filed: May 4, 2022

(65) Prior Publication Data

US 2022/0263919 A1    Aug. 18, 2022

Related U.S. Application Data

(63) Continuation of application No. PCT/KR2021/018431, filed on Dec. 7, 2021.

(30) Foreign Application Priority Data

Dec. 7, 2020  (KR) .......................... 10-2020-0169193

(51) Int. Cl.
   *H04L 67/52*    (2022.01)
(52) U.S. Cl.
   CPC .................................. *H04L 67/52* (2022.05)
(58) Field of Classification Search
   None
   See application file for complete search history.

(56) References Cited

U.S. PATENT DOCUMENTS 9,130,946 B2    9/2015   Kang et al.
10,097,295 B2   10/2018  Chun
(Continued)

FOREIGN PATENT DOCUMENTS

CN    11541922 A    8/2020
JP    4802157 B2    10/2011
(Continued)

OTHER PUBLICATIONS

International Search Report (PCT/ISA/210) dated Mar. 21, 2022 by the International Searching Authority in counterpart International Application No. PCT/KR2021/018431.
(Continued)

*Primary Examiner* — Suraj M Joshi
(74) *Attorney, Agent, or Firm* — Sughrue Mion, PLLC

(57) ABSTRACT

An electronic device and a method of controlling an electronic device are provided. The method of controlling the electronic device according transmitting, to a user terminal, a request to establish a communication connection based on a user command being received; receiving, from the user terminal, location information indicating a location of the user terminal through the communication connection which is established between the electronic device and the user terminal based on the request; identifying one or more applications corresponding to the location from an application list stored in a memory based on the location information; transmitting, to the user terminal, address information indicating web addresses for providing the one or more applications; and receiving, from the user terminal, installation information related to installation of each of the one or more applications.

20 Claims, 9 Drawing Sheets

(56) References Cited

U.S. PATENT DOCUMENTS

| | | |
|---|---|---|
| 10,185,475 B2 | 1/2019 | Choi et al. |
| 10,194,191 B2 | 1/2019 | Kim et al. |
| 10,681,406 B2 | 6/2020 | Kim et al. |
| 11,068,249 B2 | 7/2021 | Gava et al. |
| 11,284,148 B2 | 3/2022 | Kim et al. |
| 2013/0050093 A1 | 2/2013 | Kim et al. |
| 2017/0214957 A1 | 7/2017 | Oak et al. |
| 2019/0141384 A1 | 5/2019 | Kim et al. |
| 2020/0097272 A1* | 3/2020 | Gava .................. H04L 67/1095 |
| 2020/0288189 A1 | 9/2020 | Kim et al. |
| 2020/0359217 A1 | 11/2020 | Hwang et al. |
| 2021/0329329 A1 | 10/2021 | Du et al. |
| 2022/0109902 A1 | 4/2022 | Kim et al. |

FOREIGN PATENT DOCUMENTS

| | | | |
|---|---|---|---|
| KR | 10-2005-0122612 A | 12/2005 | |
| KR | 1020120122164 A | 11/2012 | |
| KR | 10-2015-0069468 A | 6/2015 | |
| KR | 10-1537786 B1 | 7/2015 | |
| KR | 10-15537786 B1 | 7/2015 | |
| KR | 10-2017-0088018 A | 8/2017 | |
| KR | 10-1881054 B1 | 8/2018 | |
| KR | 10-1978957 B1 | 5/2019 | |
| KR | 102073839 B1 | 2/2020 | |
| KR | 10-2020-0039625 A | 4/2020 | |
| KR | 20200039625 A * | 4/2020 | ............ H04W 12/06 |
| KR | 10-2020-0075795 A | 6/2020 | |
| KR | 102184496 B1 | 11/2020 | |
| KR | 1020200129297 A | 11/2020 | |

OTHER PUBLICATIONS

Written Opinion (PCT/ISA/237) dated Mar. 21, 2022 by the International Searching Authority in counterpart International Application No. PCT/KR2021/018431.

* cited by examiner

ELECTRONIC DEVICE AND CONTROLLING METHOD OF ELECTRONIC DEVICE

CROSS-REFERENCE TO RELATED APPLICATIONS

This application is a continuation application of International Application No. PCT/KR2021/018431, filed on Dec. 7, 2021, which claims benefit of priority to Korean Patent Application No. 10-2020-0169193, filed on Dec. 7, 2020, in the Korean Intellectual Property Office, the disclosures of which are incorporated by reference herein in their entireties.

BACKGROUND

Field

The disclosure relates to an electronic device and a controlling method of the electronic device, and more particularly, to an electronic device and a controlling method of the electronic device capable of installing an application in an efficient way.

Description of Related Art

Recently, various applications can be installed on an electronic device such as a television (TV), and various services are provided to users through the applications. However, from the point of view of the user, a complicated procedure may be involved until the applications are installed on the TV and the applications are usable smoothly after purchasing the TV.

Specifically, in order to install the applications on the TV, the user may be required to input the network account information of the user so that the TV can be connected to a network through an access point (AP) or the like, or the user needs to directly connect the TV to the network by wire.

Because a typical generally-available TV does not include a global positioning system (GPS) module, in order to install an application suitable for a location (region) where the TV is installed, the user may need to directly input information regarding the location (region) where the TV is installed, unless the TV includes a function to automatically set a current location based on an Internet protocol (IP) address when the TV is connected to the network.

In addition, in certain geographic locations (e.g., Europe), authentication/terms agreements, applications to be used, and the like may vary depending on which country the TV is installed in even though the TV may be the same model.

Furthermore, even if the applications are installed on the TV, in order for the user to use the applications smoothly, the user may need to suffer inconvenience by directly inputting the login information of the user for each of the applications.

SUMMARY

Provided are an electronic device and a controlling method of the electronic device capable of installing an application in an efficient way by receiving installation information for the application through a user terminal without connection to a wired or wireless network via an access point (AP) or the like.

Additional aspects will be set forth in part in the description which follows and, in part, will be apparent from the description, or may be learned by practice of the presented embodiments.

According to an aspect of the disclosure, there is provided an electronic device including: a communication interface; a memory in which at least one instruction is stored; and a processor configured to execute the at least one instruction to: control the communication interface to transmit, to a user terminal, a request to establish a communication connection based on receiving a user command; receive, from the user terminal via the communication interface, location information indicating a location of the user terminal through the communication connection which is established between the electronic device and the user terminal based on the request; identify one or more applications corresponding to the location from an application list stored in the memory based on the location information; control the communication interface to transmit, to the user terminal, address information indicating web addresses for providing the one or more applications; and receive, from the user terminal through the communication interface, installation information related to installation of each of the one or more applications.

The installation information received from the user terminal may have been transmitted to the user terminal from a server connected to the user terminal, and the processor may be further configured to execute the at least one instruction to receive, from the user terminal through the communication interface, at least one of user account information and environment setting information for each of at least one application installed on the user terminal based on the at least one application installed on the user terminal being included in the one or more applications.

The processor may be further configured to execute the at least one instruction to: execute a first application of the at least one application based on the installation information; log in to the first application based on the user account information, based on log-in request information being included on a screen for the first application; and set user environments for the first application based on the environment setting information.

The location of the user terminal may be the same as a location of the electronic device, and the location information may include at least one of information regarding a country in which the user terminal is located and information regarding a region in which the user terminal is located.

The communication connection may be established based on the request and a response to the request received from the user terminal through the communication interface, the communication connection may be a Wireless-Fidelity (Wi-Fi) direct connection for one-to-one communication between the electronic device and the user terminal, and the request and the response may be transmitted and received through Bluetooth communication.

The processor may be further configured to execute the at least one instruction to: terminate the communication connection in response to transmitting the address information to the user terminal; and recommence the communication connection in response to receiving the installation information from the user terminal.

The processor may be further configured to execute the at least one instruction to: control the communication interface to transmit, to the user terminal, the address information for each of the one or more applications, based on a number of times that the electronic device has been booted being one; and control the communication interface to transmit, to the user terminal, the address information for each of the one or more applications other than an application installed on the electronic device among the one or more applications, based on the number of times that the electronic device has been booted being more than one.

The processor may be further configured to execute the at least one instruction to transmit and receive the location information, the address information, and the installation information through the communication connection when the electronic device is in a state where the electronic device is not connected to a wired or wireless network for communication with a server.

The user command may correspond to a speech signal received through a microphone included in at least one of the electronic device, the user terminal, and a remote control device for controlling the electronic device.

The electronic device may further include an input/output interface for inputting or outputting a video signal and an audio signal, and the processor may be further configured to execute the at least one instruction to: identify a location of the electronic device based on metadata included in a broadcast signal based on the broadcast signal being received through the input/output interface; and identify the one or more applications corresponding to the identified location of the electronic device.

According to an aspect of the disclosure, there is provided method of controlling an electronic device, the method including: transmitting, to a user terminal, a request to establish a communication connection based on a user command being received; receiving, from the user terminal, location information indicating a location of the user terminal through the communication connection which is established between the electronic device and the user terminal based on the request; identifying one or more applications corresponding to the location from an application list stored in a memory based on the location information; transmitting, to the user terminal, address information indicating web addresses for providing the one or more applications; and receiving, from the user terminal, installation information related to installation of each of the one or more applications.

The installation information received from the user terminal may have been transmitted to the user terminal from a server connected to the user terminal, and the method may further include receiving, from the user terminal, at least one of user account information and environment setting information for each of at least one application installed on the user terminal based on the at least one application installed on the user terminal being included in the one or more applications.

The method may further include: executing a first application of the at least one application based on the installation information; logging in to the first application based on the user account information, based on log-in request information being included on a screen for the first application; and setting user environments for the first application based on the environment setting information.

The location of the user terminal may be the same as a location of the electronic device, and wherein the location information may include at least one of information regarding a country in which the user terminal is located and information regarding a region in which the user terminal is located.

The communication connection may be established based on the request and a response to the request received from the user terminal, the communication connection may be a Wireless-Fidelity (Wi-Fi) direct connection for one-to-one communication between the electronic device and the user terminal, and the request and the response may be transmitted and received through Bluetooth communication.

The method may further include: terminating the communication connection in response to transmitting the address information to the user terminal; and recommencing the communication connection in response to receiving the installation information from the user terminal.

The transmitting the address information may include: transmitting, to the user terminal, the address information for each of the one or more applications, based on a number of times that the electronic device has been booted being one; and transmitting, to the user terminal, the address information for each of the one or more applications other than an application installed on the electronic device among the one or more applications, based on the number of times that the electronic device has been booted being more than one.

The method may further include: transmitting and receiving the location information, the address information, and the installation information through the communication connection when the electronic device is in a state where the electronic device is not connected to a wired or wireless network for communication with a server.

The method may further include: identifying a location of the electronic device based on metadata included in a broadcast signal; and identifying the one or more applications corresponding to the location of the electronic device.

According to an aspect of the disclosure, there is provided a non-transitory computer-readable recording medium containing a program that is executed by a processor to perform a method of controlling an electronic device, the method including: transmitting, to a user terminal, a request for communication connection based on a user command being received; receiving, from the user terminal, location information indicating a location of the user terminal through the communication connection which is established between the electronic device and the user terminal based on the request; identifying one or more applications corresponding to the location from an application list stored in a memory based on the location information; transmitting, to the user terminal, address information indicating web addresses for providing the one or more applications; and receiving, from the user terminal, installation information related to installation of each of the one or more applications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
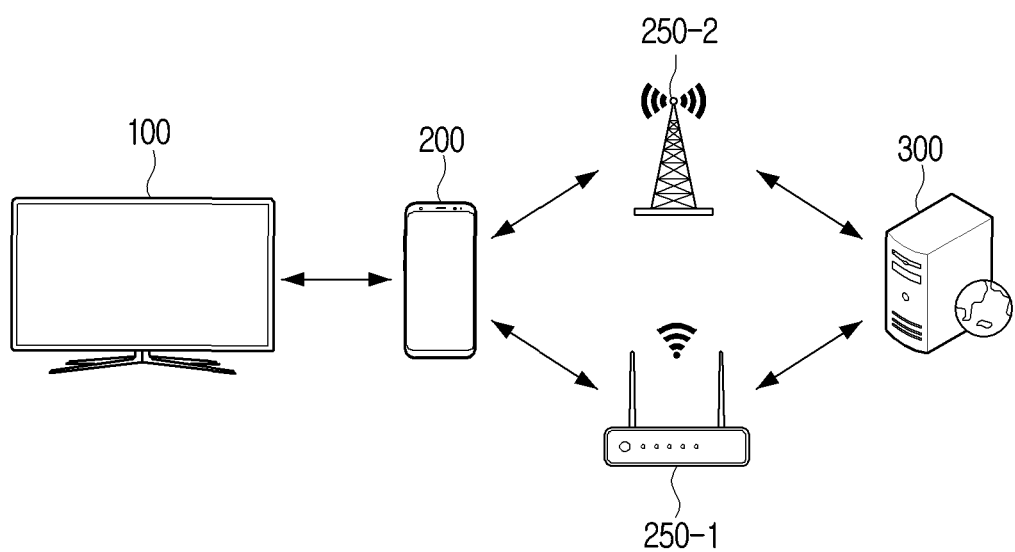
FIG. 1 is a conceptual diagram for briefly explaining an electronic device, a user terminal, a server, and other network devices according to an embodiment of the disclosure.

The embodiments may be diversely modified, and there may be various embodiments, and accordingly, specific embodiments are illustrated in the drawings and are described in detail in the detailed description. However, it should be understood that there is no intent to limit the disclosure to the particular forms disclosed herein, and rather, the disclosure should be construed to cover various modifications, equivalents, and/or alternatives of embodiments of the disclosure. In describing the drawings, similar reference numerals may be used to denote similar elements.

In describing the disclosure, when it is determined that a detailed description of relevant known functions or configurations may unnecessarily obscure the gist of the disclosure, the detailed description thereof will be omitted.

In addition, the following embodiments may be modified in many different forms, and the scope of the technical spirit of the disclosure is not limited to the following embodiments. Rather, these embodiments are provided to make the disclosure more thorough and complete and to fully transfer the technical spirit of the disclosure to those skilled in the art.

The terms used herein are only to describe particular embodiments and are not intended to limit the scope of the disclosure. Singular forms include plural forms unless the context clearly indicates otherwise.

The expressions "have", "may have", "include", "may include", and the like used herein indicates the presence of stated features (e.g., elements such as numerical values, functions, operations, or parts) and do not preclude the presence of additional features.

The expressions "A or B", "at least one of A and/or B", "one or more of A and/or B", and the like used herein may include all possible combinations of items enumerated therewith. For example, "A or B", "at least one of A and B", or "at least one of A or B" means (1) including at least one A, (2) including at least one B, or (3) including both at least one A and at least one B.

The expressions "first", "second", and the like used herein may modify various elements regardless of order and/or importance, and may be used to distinguish one element from another element, and do not limit the components.

It should further be understood that when an element (e.g., a first element) is referred to as being "(operatively or communicatively) coupled with/to" or "connected to" another element (e.g., a second element), this means that an element is coupled with/to or connected to another element directly or via an intervening element (e.g., a third element).

On the other hand, it should be understood that when an element (e.g., a first element) is referred to as being "directly coupled with/to" or "directly connected to" another element (e.g., a second element), this means that there is no intervening element (e.g., a third element) between an element and another element.

The expressions "configured to (or set to)" used herein may be used interchangeably with "suitable for", "having the capacity to", "designed to", "adapted to", "made to", or "capable of" according to a context. The term "configured to (set to)" does not necessarily mean "specifically designed to" in hardware.

Instead, the expression "a device configured to . . . " may mean that the device is "capable of . . . " along with other devices or parts in a certain context. For example, the phrase "a processor configured to (set to) perform A, B, and C" may mean a dedicated processor (e.g., an embedded processor) for performing the corresponding operations, or a generic-purpose processor (e.g., a central processing unit (CPU) or an application processor) capable of performing the corresponding operations by executing one or more software programs stored in a memory device.

In an embodiment, a "module" or a "unit" performs at least one function or operation, and may be implemented as hardware, software, or combination thereof. In addition, a plurality of "modules" or a plurality of "units" may be integrated into at least one module and may be implemented as at least one processor except for "modules" or "units" that need to be implemented in specific hardware.

Various elements and regions in the drawings are schematically illustrated. Thus, the technical spirit of the disclosure is not limited by relative sizes or distances shown in the drawings.

An electronic device according to various embodiments of the disclosure may include at least one of, for example, a smartphone, a tablet PC, a desktop PC, a laptop PC, or a wearable device. The wearable device may include at least one of an accessory type device (e.g., a watch, a ring, a bracelet, an ankle bracelet, a necklace, glasses, a contact lens, or a head-mounted device (HMD)), a device integrated with fabrics or clothing (e.g., electronic clothing), a body-attached device (e.g.: a skin pad or a tattoo), or an implantable circuit.

In some embodiments, the electronic device may include at least one of, for example, a TV, a digital video disc (DVD) player, an audio, a refrigerator, an air conditioner, a cleaner, an oven, a microwave oven, a washing machine, an air cleaner, a set-top box, a home automation control panel, a security control panel, a media box (e.g., Samsung Home-Sync™, Apple TV™, or Google TV™), a game console (e.g., Xbox™ or PlayStation™), an electronic dictionary, an electronic key, a camcorder, or an electronic picture frame.

In other embodiments, the electronic device may include at least one of any kind of medical device (e.g., any kind of portable medical measurement device (such as a blood glucose meter, a heart rate meter, a blood pressure meter, or a body temperature meter), a magnetic resonance angiography (MRA), a magnetic resonance imaging (MRI), a computed tomography (CT), a photographing device, or an ultrasonic device), a navigation device, a global navigation satellite system (GNSS), an event data recorder (EDR), a flight data recorder (FDR), an automobile infotainment device, a marine electronic equipment (e.g., a marine navigation device or a gyro compass), avionics, a security device, an automobile head unit, an industrial or household robot, a drone, an automated teller machine (ATM) of a financial institute, a point of sales (POS) of a shop, or an Internet of things (IoT) device (e.g., a light bulb, any kind of sensor, a sprinkler system, a fire alarm, a thermostat, a street light, a toaster, an exercise equipment, a hot water tank, a heater, or a boiler).

Hereinafter, embodiments according to the disclosure will be described in detail with reference to the accompanying drawings so that the embodiment can be easily carried out by those having ordinary knowledge in the art to which the disclosure pertains.

FIG. 1 is a conceptual diagram for briefly explaining a system comprising an electronic device 100, a user terminal 200, a server 300, and other network devices according to an embodiment of the disclosure.

The electronic device 100\, according to the disclosure, may refer to a device capable of providing various types of applications. The electronic device 100 may install one or more applications according to various embodiments as will be described below. For example, the electronic device 100 may be implemented as a television (TV) as illustrated in FIG. 1, however the type of the electronic device 100 may not limited to a TV.

The user terminal 200 may refer to a device capable of communicating with the electronic device 100 and the server 300. For example, the user terminal 200 may be connected to a Wireless-Fidelity (Wi-Fi) network through an access point (AP) 250-1, and may also be connected to a mobile network through a base station 250-2. In addition, the user terminal 200 may communicate with the server 300 through the Wi-Fi network and/or the mobile network. In some embodiments, the user terminal 200 may communicate with the electronic device 100 in such a manner as described below. For example, the user terminal 200 may be implemented as a smart phone as illustrated in FIG. 1, but the type of the user terminal 200 is not particularly limited in a similar manner to the type of the electronic device 100.

The server 300 may refer to a device capable of providing various types of applications and/or services. In addition, a web address and/or a uniform resource locator (URL) address may be assigned to each of the applications provided by the server 300, such that the user terminal 200 may access the server 300 through a web address corresponding to each application of the applications provided by the server 300 and then receive installation information for each of the applications. In some embodiments, the server 300 may be implemented as a plurality of servers 300. However, for simplicity, the server 300 may be described and/or referred to as one server 300.

In some embodiments, the electronic device 100 may not be connected to a wireless network through the access point 250-1 nor to the base station 250-2 nor connected to a wired network. That is, the electronic device 100 may install one or more applications by communicating with the user terminal 200 in a one-to-one manner without directly communicating with the server 300 according to various embodiments of the disclosure. Hereinafter, various embodiments according to the disclosure will be described with reference to FIGS. 2 to 9.

Figure 2:
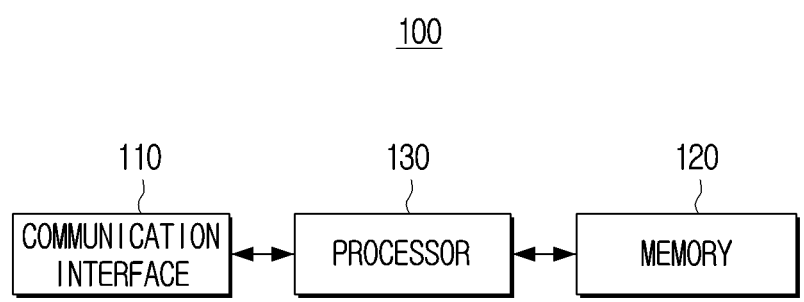
FIG. 2 is a block diagram schematically illustrating a configuration of the electronic device according to an embodiment of the disclosure.

FIG. 2 is a block diagram schematically illustrating a configuration of the electronic device 100 according to an embodiment of the disclosure.

As illustrated in FIG. 2, the electronic device 100 according to an embodiment of the disclosure includes a communication interface 110, a memory 120, and a processor 130.

The communication interface 110 may include a circuit, and may communicate with an external device such as the user terminal 200. In some embodiments, the processor 130 may receive various kinds of data or information from the user terminal 200 through the communication interface 110, and may also transmit various kinds of data or information to the user terminal 200 through the communication interface 110. Alternatively or additionally, the processor 130 may perform communication connections with the server 300 through the communicator 110. In other embodiments, the processor 130 may install one or more applications without performing a communication connection with the server 300 as described in reference to FIG. 1.

The communicator 110 may include at least one of a Wi-Fi module, a Bluetooth module, a wireless communication module, and an near-field communication (NFC) module (not shown). For example, the Wi-Fi module and the Bluetooth module may perform communication in a Wi-Fi mode and in a Bluetooth mode, respectively. In some embodiments, the Wi-Fi module or the Bluetooth module may be used. In such embodiments, connection information, such as a service set identifier (SSID), may first be transmitted and/or received in order to establish a communication connection, and, subsequently, information may be transmitted and/or received after communication connection using the connection information.

In other embodiments, the wireless communication module may perform communication according to various communication standards such as Institute of Electrical and Electronics Engineers (IEEE) 802.11, Zigbee, 3rd generation (3G), 3rd generation partnership project (3GPP), long term evolution (LTE), and 5th generation (5G). Alternatively or additionally, the NFC module may perform communications in a NFC mode using, for example, a band of 13.56 MHz among various RF-ID frequency bands such as 135 kHz, 13.56 MHz, 433 MHz, 860 to 960 MHz, and 2.45 GHz.

In some embodiments, the processor 130 may receive location information from the user terminal 200 through the communication interface 110, control the communication interface 110 to transmit address information to the user terminal 200, and receive installation information from the user terminal 200 through the communication interface 110. Alternatively or additionally, the processor 130 may receive user account information and environment setting information through the communication interface 110. A control process of the processor 130 through the communication with the user terminal 200 will be described in detail in various embodiments of the disclosure below. The meanings of the address information, the installation information, the user account information, the environment setting information, and the like according to the disclosure will be described below.

At least one instruction related to the electronic device 100 may be stored in the memory 120. Further, an operating system (O/S) for operating the electronic device 100 may be stored in the memory 120. Alternatively or additionally, various software programs and/or applications for operating the electronic device 100 according to various embodiments of the disclosure may be stored in the memory 120. In addition, the memory 120 may include a semiconductor memory such as a flash memory or a magnetic storage medium such as a hard disk.

For example, various software modules for operating the electronic device 100 according to various embodiments of the disclosure may be stored in the memory 120, and the processor 130 may execute the various software modules stored in the memory 120 to control an operation of the electronic device 100. That is, the memory 120 may be accessed by the processor 130, and data of the memory 120 may be read, written, modified, deleted, or updated by the processor 130.

The memory 120 include a read-only memory (ROM) (not shown) in the processor 130, a random-access memory (RAM) (not shown), and/or a memory card (not shown) (e.g., a micro Secure Digital (SD) card or a memory stick) mounted on the electronic device 100.

In some embodiments, various information such as location information, address information, installation information, user account information, and environment setting information according to the disclosure may be stored in the memory 120, and information regarding an application list may be stored in the memory 120. Alternatively or additionally, various information required within the scope of the disclosure may be stored in the memory 120, such that the information stored in the memory 120 may be updated by being received from an external device such as the user terminal 200 or by being input by a user.

In some embodiments, the processor 130 may control an overall operation of the electronic device 100. For example, the processor 130 may be communicatively coupled to the above-described components of the electronic device 100 including the communication interface 110 and the memory 120, and may control the overall operation of the electronic device 100 by executing at least one instruction stored in the memory 120 as described above.

The processor 130 may be implemented in various ways. For example, the processor 130 may be implemented by at least one of an application specific integrated circuit (ASIC), an embedded processor, a microprocessor, a hardware control logic, a hardware finite state machine (FSM), and a digital signal processor (DSP). Alternatively or additionally, the processor 130 may include a CPU, a graphic processing unit (GPU), a main processing unit (MPU), and the like.

In some embodiments, the processor 130 may install one or more applications by communicating with the user terminal 200 in a one-to-one manner without directly communicating with the server 300 through a wired or wireless network.

For example, if or when a user command is received, the processor 130 may control the communication interface 110 to transmit a request for communication connection to the user terminal 200. Based on the transmitted request, the electronic device 100 and the user terminal 200 may establish a communication connection. In some embodiments, the processor 130 may receive, using the communication connection with the user terminal 200, location information indicating a location of the user terminal 200 from the user terminal 200 through the communication interface 110.

In response to receiving the location information indicating the location of the user terminal 200, the processor 130 may identify one or more applications corresponding to the location from the application list stored in the memory 120 based on the received location information. Alternatively or additionally, the processor 130 may control the communication interface 110 to transmit address information indicating web addresses for providing the identified one or more applications to the user terminal 200. Then, the processor 130 may receive installation information related to installation of each application of the one or more applications from the user terminal 200 through the communication interface 110, and install each application of the one or more applications according to the installation information.

Hereinafter, various embodiments related to the control process of the processor 130 will be described in more detail with reference to FIG. 3.

Figure 3:
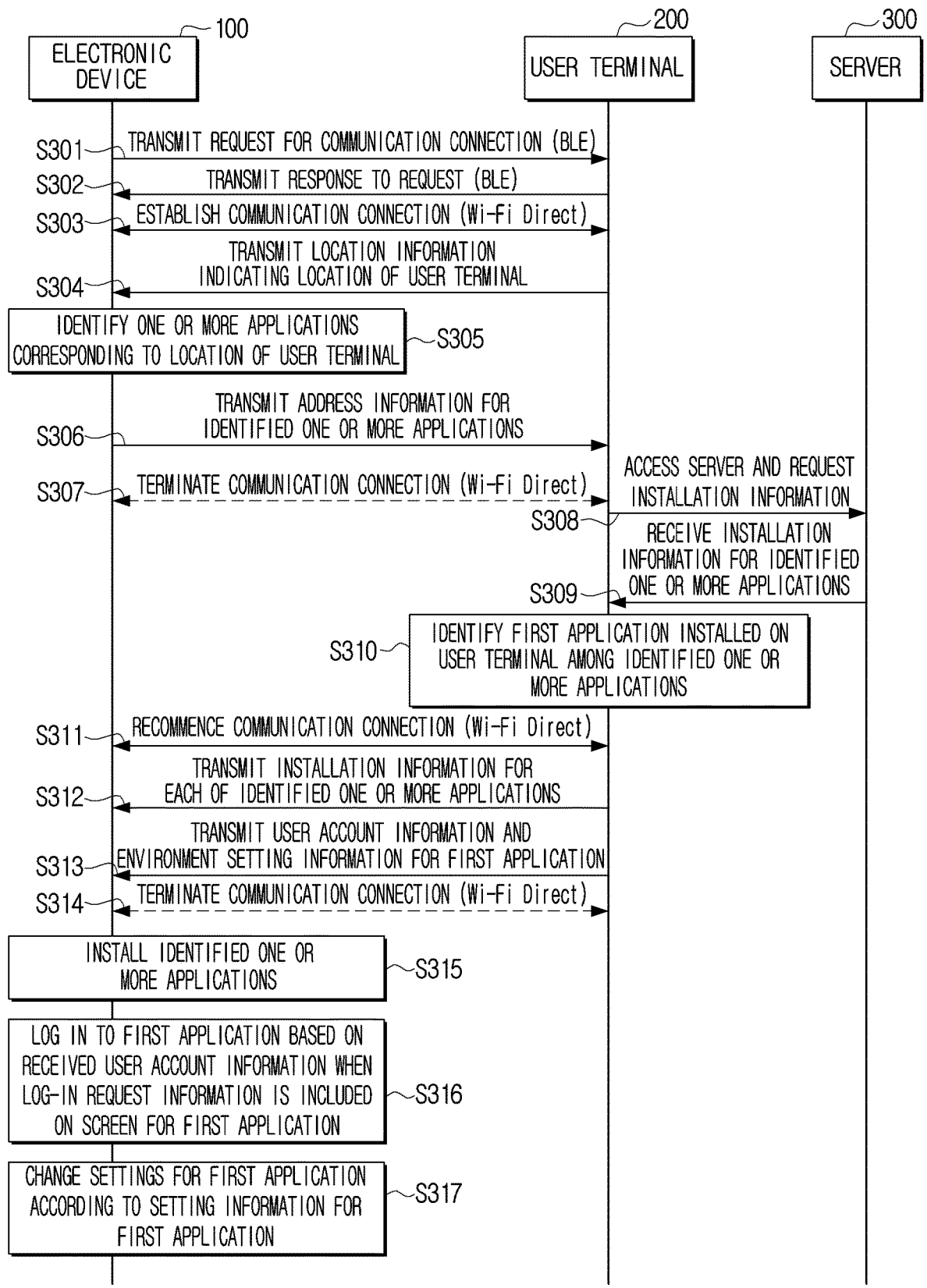
FIG. 3 is a sequence diagram of a controlling method of the electronic device according to an embodiment of the disclosure.

FIG. 3 is a sequence diagram of a controlling method of the electronic device 100 according to an embodiment of the disclosure.

At step S301, the processor 130 may receive a user command (S301). The user command may be a command for installing one or more applications in the electronic device 100. For example, the user command may be a command for automatically installing basic applications required for the electronic device 100 in an initial setting stage after the user has purchased the electronic device 100, or when a location of the electronic device 100 has changed after the initial setting. That is, the user command may be a command for automatically installing basic applications corresponding to the changed location.

In some embodiments, the user command may be received based on a user touch input through a display of the electronic device 100, a user speech received through a microphone of the electronic device 100, an input through a physical button provided in the electronic device 100, a control signal transmitted by a remote control device for controlling the user terminal 200 or the electronic device 100, or the like. Various embodiments related to the reception of the user command will be described with reference to FIGS. 5 and 6.

In some embodiments, the steps described in reference to FIG. 3 may be sequentially performed for all of the steps according to one user command. In other embodiments, the steps may be performed under the condition that an additional user command is received for at least one of the steps.

Referring to step S301, in response to receiving the user command, the processor 130 may control the communication interface 110 to transmit a request for communication connection to the user terminal 200. Then, at step S302, the processor 130 may receive a response to the request from the user terminal 200 through the communication interface 110. At step S303, the processor 130 may establish the communication connection between the electronic device 100 and the user terminal 200 based on the request for the communication connection and the response thereto.

The communication connection may refer to a connection for one-to-one communication between the electronic device 100 and the user terminal 200, and may be, for example, a Wi-Fi direct connection. Alternatively or additionally, the request for establishing the communication connection and the response thereto may be transmitted and received between the electronic device 100 and the user terminal 200 through Bluetooth communication (e.g., Bluetooth low energy (BLE)).

The user terminal 200 may transmit location information indicating a location of the user terminal 200 to the electronic device 100, and accordingly, the processor 130 may receive the location information from the user terminal 200 through the communication interface 110 (S304).

The location information may be information indicating the location of the user terminal 200, and, for example, may include at least one of information regarding a country in which the user terminal 200 is located and information regarding a city in which the user terminal 200 is located. In some embodiments, the location information may be referred to as region information or the like. In other embodiments, the user terminal 200 may acquire the location information through a network connected to the user terminal 200 by acquiring information regarding a location for each time at which the user terminal 200 is connected to the network.

In some embodiments, a user of the electronic device 100 may be the same as the user of the user terminal 200, and as such, a location of the user terminal 200 match the location of the electronic device 100. That is, the processor 130 may identify a location of the user terminal 200 based on the received location information, and may further identify a location (e.g., region) of the electronic device 100 corresponding to the location of the user terminal 200. For example, the electronic device 100 may identify a country or a region where the electronic device 100 is located.

Subsequent to receiving the location information indicating the location of the user terminal 200, the processor 130 may identify one or more applications corresponding to the location of the user terminal 200 from the application list stored in the memory 120 based on the received location information (S305).

In some embodiments, the application list may have been previously created (e.g., by a developer) and stored in the memory 120 of the electronic device 100, and may include information regarding applications corresponding to each location of a plurality of locations (e.g., countries or regions). That is, the applications corresponding to each location of the plurality of locations may be applications that have been evaluated (e.g., by the developer) as being necessary in the corresponding location, and/or may be applications that have been evaluated as being highly preferred by users in the corresponding location. In other embodiments, the application list may be updated based on information received from an external device (e.g., server 300).

For example, the application list may include information that one or more applications corresponding to location "Suwon, South Korea" are applications "AAA", "BBB", and "CCC", and information that one or more applications corresponding to location "Los Angeles, USA" are applications "DDD", "EEE", and "FFF", information that one or more applications corresponding to location "Munich, Germany" are applications "GGG" and "HHH", and the like.

In some embodiments, when the location of the user terminal 200 and the electronic device 100 is identified, the processor 130 may identify one or more applications corresponding to the location identified from the application list based on the information regarding applications for each location included in the application list. That is, in the above-described example, if or when it is identified that the location of the user terminal 200 and the electronic device 100 is "Suwon, Seoul", the processor 130 may identify one or more applications corresponding to "Suwon, Seoul" from the application list (i.e., "AAA", "BBB", and "CCC").

At step S306, if or when the one or more applications are identified, the processor 130 may control the communication interface 110 to transmit address information indicating web addresses for providing the identified one or more applications to the user terminal 200.

The address information may be information indicating a web address for providing each of the applications. For example, the address information may include URL address information for each website directly indicating a web address and/or separate data enabling access to a specific website or an application store. In some embodiments, the address information may include information regarding a web address for installing an application in a version compatible with the operating system and hardware specifications of the electronic device 100 among the identified applications. Alternatively or additionally, the address information may include information regarding a web address for installing an application in a latest version among the identified applications. For example, the processor 130 may control the communication interface 110 to transmit URL address information for each of the applications "AAA", "BBB", and "CCC" to the user terminal 200.

In some embodiments, the electronic device 100 may identify whether the number of times that the electronic device 100 has been booted is one, and control the communication interface 110 to transmit different address information to the user terminal 200 according to an identification result.

That is, if or when the number of times that the electronic device 100 has been booted is one, the processor 130 may control the communication interface 110 to transmit address information for each of the identified one or more applications to the user terminal 200. For example, if or when the electronic device 100 is booted for the first time and the electronic device 100 is in an initial setting state, the processor 130 may control the communication interface 110 to transmit address information for all of the applications corresponding to the identified location to the user terminal 200.

Alternatively or additionally, if or when the number of times that the electronic device 100 has been booted is more than one, the processor 130 may control the communication interface 110 to transmit address information for each of the applications other than an application installed on the electronic device 100 among the identified one or more applications to the user terminal 200. For example, if or when the electronic device 100 has completed the initial setting stage, the electronic device 100 may not need to transmit address information for the applications already installed on the electronic device 100 to the user terminal 200, and thus, the processor 130 may control the communication interface 110 to transmit address information only for the applications other than an application already installed on the electronic device 100 to the user terminal 200. In other embodiments, if or when the applications are automatically installed when the number of times that the electronic device 100 has been booted is more than one, this may indicate that the location (e.g., country or region) of the electronic device 100 has been changed.

The communication connection previously established between the electronic device 100 and the user terminal 200 may be terminated as the address information is transmitted to the user terminal 200 (S307). In some embodiments, the communication connection for one-to-one communication between the electronic device 100 and the user terminal 200 may be terminated after the address information is transmitted to the user terminal 200 in order to allow the user terminal 200 to establish another communication connection between the user terminal 200 and the server 300. In other embodiments, the user terminal 200 may have a physical configuration capable of communicating with the server 300 while maintaining the communication connection with the electronic device 100 (e.g., an Ethernet module of the user terminal 200 may be implemented to have a plurality of physical layers). In such embodiments, the communication connection established between the electronic device 100 and the user terminal 200 may be maintained (e.g., not terminated) after the address information has been transmitted to the user terminal 200 (S307).

The user terminal 200 receiving the address information may access the server 300 corresponding to each of the address information, and request installation information for an application corresponding to each of the address information (S308). Then, in step S309, the user terminal 200 may receive the installation information for the application corresponding to each of the address information from the server 300 accordingly.

The installation information may be information for installing each of the applications on the electronic device 100. For example, the installation information may include installation files for each of the applications. That is, the installation information may include at least a portion of the installation files needed for installing each of the applications. For example, the installation information may be installation files in an android package (APK) format for each of the applications "AAA", "BBB", and "CCC". Alternatively or additionally, the installation information may include a latest version of the APK files that may be compatible with the operating system and/or hardware specifications of the electronic device 100 from the available APK files for each of "AAA", "BBB", and "CCC".

The user terminal 200 may identify at least one application installed on the user terminal 200 among the one or more applications identified by the electronic device 100 (S310). That is, the identified at least one application may include an application that matches the application identified by the electronic device 100. The identified at least one application may include an application with a matching application name to the application identified by the electronic device 100 with a difference in version and/or plug-in information. If or when the communication connection between the electronic device 100 and the user terminal 200 has been terminated, the communication connection between the electronic device 100 and the user terminal 200 may be recommenced, at step S311, after the user terminal 200 completes receiving the installation information from the server 300.

When the installation information is received from the server 300, the user terminal 200 may transmit, via the communication connection, the received installation information to the electronic device 100, and accordingly, the processor 130 may receive the installation information related to installation of each of the one or more applications from the user terminal 200 through the communication interface 110 (S312).

When at least one application installed on the user terminal 200 is identified among the one or more applications identified by the electronic device 100 in step S310, the user terminal 200 may transmit at least one of user account information and environment setting information for each of the at least one application to the electronic device 100, and accordingly, the electronic device 100 may receive at least one of the user account information and the environment setting information from the user terminal 200 through the communication interface 110 (S313).

That is, the user terminal 200 may transmit at least one of the user account information and the environment setting information as well as the installation information to the electronic device 100, when at least one application installed on the user terminal 200 is included in the one or more applications identified by the electronic device 100.

Hereinafter, for convenience of description, a "first application" will be described as an example of the at least one application installed on the user terminal 200.

The user account information may include information regarding a user identification (ID) and/or a password for the first application. For example, the user account information may include user personal information. In some embodiments, the user account information may be transmitted to the electronic device 100 after being encrypted by the user terminal 200, and then decrypted by the electronic device 100. In other embodiments, the user terminal 200 may transmit the user account information to the electronic device 100 on the assumption that the user account information for the corresponding application is input to and stored in the user terminal 200.

The environment setting information may include information regarding various parameters configuring user environments for the first application. For example, the environment setting information may include information indicating a result when default settings for the user environments for the first application are changed by the user.

When the transmitting and receiving of the address information, the installation information, the user account information, the environment setting information, and the like is completed as described above in reference to steps S306 through S313, the communication connection between the electronic device 100 and the user terminal 200 may be terminated again (S314). In some embodiments, the communication connection between the electronic device 100 and the user terminal 200 may continue to be maintained.

The processor 130 may install each of the one or more applications based on the received installation information (S315). Alternatively or additionally, the processor 130 may execute the installed one or more applications, and accordingly, the one or more applications may be provided to the user.

When a user interface screen for the first application requests log-in request information, the processor 130 may log in to the first application based on the user account information received from the user terminal 200 (S316).

In some embodiments, the processor 130 may identify whether or not the log-in request information is included on the user interface screen for the first application by identifying whether or not the information displayed on the screen for the first application includes information regarding a user ID and a password and/or whether or not the information regarding the user ID and the password is maintained for a predetermined time. An example method for identifying whether or not the log-in request information is included on the screen for the first application is described with reference to FIGS. 7 and 8.

When the processor 130 identifies that the log-in request information is included on the screen for the first application, the processor 130 may automatically input the user ID and the password, included in the user account information, to an ID input field and/or a password input field included on the screen for the first application, respectively. In some embodiments, the processor 130 may perform processing to prevent display of at least part of the user ID and/or the password on the display of the electronic device 100 and/or the user terminal 200.

The processor 130 may set user environments for the first application based on the environment setting information received from the user terminal 200 (S317). In some embodiments, the processor 130 may set the user environments for the first application by changing default settings for the user environments of the first application to correspond to the received environment setting information.

According to the embodiments described above with reference to FIGS. 1 to 3, the electronic device 100 can install applications in an efficient way by receiving installation information regarding the applications from the user terminal 200 without requiring a connection to a wired network or a wireless network through an access point (e.g., 250) or the like.

In some embodiments, if or when basic applications to be installed on the electronic device 100 differ by country or by region, the electronic device 100 may automatically install the applications suitable for the country or region without having a need for a GPS module, without a need for the electronic device 100 to be connected to a wired network or a wireless network, and with no user input for the location of the electronic device 100.

In other embodiments, the electronic device 100 may receive the installation information for the applications and/or the user account information and the environment setting information for the applications from the user terminal 200, thereby significantly improving user convenience in logging in to the applications and setting environments.

Figure 4:
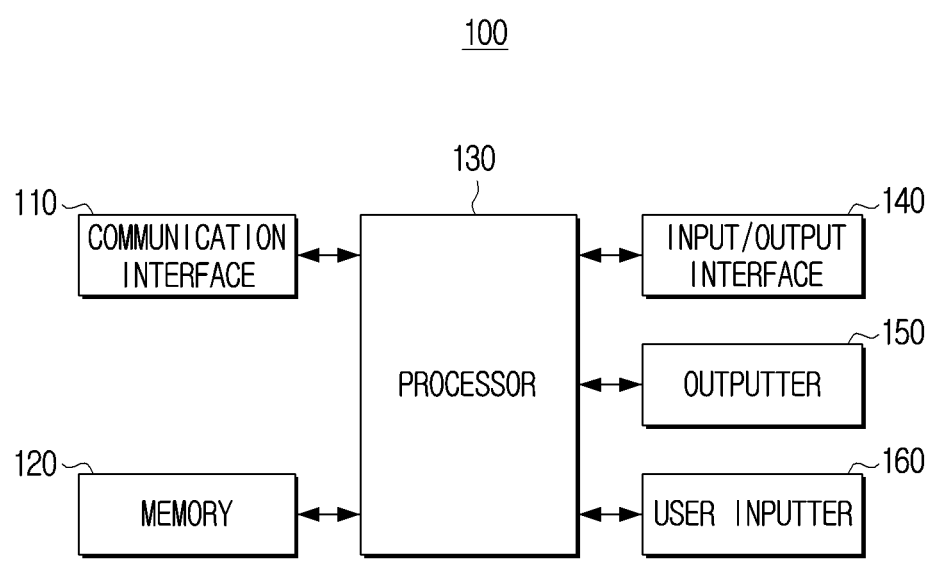
FIG. 4 is a block diagram illustrating a configuration of the electronic device according to an embodiment of the disclosure.

FIG. 4 is a block diagram illustrating a configuration of the electronic device 100 according to an embodiment of the disclosure.

As illustrated in FIG. 4, the electronic device 100 may include an input/output interface 140, an outputter (or output interface) 150, and a user inputter (or user input interface) 160 in addition to the communication interface 110, the memory 120, and the processor 130 previously described in reference to FIG. 2. The configurations illustrated in FIGS. 2 and 4 are merely examples, and the disclosure may be implemented with features and/or configurations being added to and/or removed from the configurations of FIG. 2 without deviating from the disclosure. The communication interface 110, the memory 120, and the processor 130 have been described above with reference to FIGS. 1 to 3. The input/output interface 140, the outputter 150, and the user inputter 160 will be described below.

The input/output interface 140 may output a video signal and/or an audio signal corresponding to video data and/or audio data to an external device connected to the electronic device 100. Also, the processor 130 may receive a video signal and/or an audio signal through the input/output interface 140. In some embodiments, the input/output interface 140 may include a video interface for inputting and/or outputting a video signal and/or an audio interface for inputting and/or outputting an audio signal. In other embodiments, the video interface and the audio interface may be implemented as one configuration.

For example, the input/output interface 140 may include at least one of a display port (DP), a high definition multimedia interface (HDMI) port, a video graphics array (VGA) port, a digital visual interface (DVI), and a thunderbolt, and may also include an input port for receiving a broadcast signal.

In some embodiments, the processor 130 may receive a broadcast signal through the input/output interface 140, and the processor 130 may identify a location of the electronic device 100 based on metadata included in the broadcast signal. Consequently, the processor 130 may identify one or more applications corresponding to the identified location of the electronic device 100. In other embodiments, the processor 130 may receive metadata along with a broadcast signal. For example, the broadcast signal may be a hybrid broadcast broadband TV (Hbb TV). Alternatively or additionally, if or when the broadcast signal includes metadata for identifying a location of the electronic device 100, the processor 130 may identify a location of the electronic device 100 based on the received metadata, and identify one or more applications corresponding to the identified location of the electronic device 100. In some embodiments, the processor 130 may output, to an external device through the input/output interface 140, a video signal corresponding to a screen for the application to display the screen for the application on a display of the external device.

The outputter 150 may include a circuit and may output various functions that the processor 130 of the electronic device 100 can perform through. In some embodiments, the outputter 150 may include at least one of a display, an audio signal outputter 150, a speaker, and an indicator.

In some embodiments, the display may output image data under the control of the processor 130. For example, the display may output an image previously stored in the memory 120 under the control of the processor 130. That is, the display may display a user interface stored in the memory 120. In other embodiments, the display may be implemented as a liquid crystal display (LCD) panel, an organic light emitting diodes (OLED), or the like, and the display may be implemented as a flexible display, a transparent display, or the like, if necessary. That is, according to the disclosure, the display may not be limited to a specific type.

In some embodiments, the speaker of the outputter 150 may output audio data under the control of the processor 130. Additionally, the indicator of the outputter 150 may be turned on and/or off under the control of the processor 130.

That is, the processor 130 may control the display of the outputter 150 to display a screen for an application, output audio data related to an application through the speaker of the outputter 150, and/or provide a user notification related to an application through the indicator of the outputter 150.

The user inputter 160 may include a circuit, and the processor 130 may receive a user command for controlling an operation of the electronic device 100 through the user inputter 160. For example, the user inputter 160 may include a microphone, a camera, a remote control signal receiver, and the like. Alternatively or additionally, the user inputter 160 may be implemented as a touch screen included in the display of the outputter 150.

In some embodiments, the processor 130 may receive a user command for installing one or more applications on the electronic device 100 through the user inputter 160. For example, the user command may be a command for automatically installing basic applications required for the electronic device 100 in an initial setting stage after the user purchases the electronic device 100, and/or when a location of the electronic device 100 has changed after the initial setting. That is, the user command may be a command for automatically installing basic applications corresponding to the changed location.

In some embodiments, the user command may be received in the form of a speech signal through the microphone included in the user inputter 160. In other embodiments, the user command may be received based on a motion of the user (e.g., gesture) acquired through the camera included in the user inputter 160. Alternatively or additionally, the user command may be received from a remote control device for controlling the electronic device 100 through the remote control signal receiver included in the user inputter 160, and/or may be received based on a touch interaction of the user input through the touch screen included in the user inputter 160. In some embodiments, the user command may be received based on a tapping motion of the user at one of the corners of the electronic device 100.

In some embodiments, the user command may be received from the user terminal 200 or from the remote control device as a signal corresponding to the user command input through a user inputter 160 included in the user terminal 200 or the remote control device, rather than being directly input through the user inputter 160 included in the electronic device 100.

Figure 5:
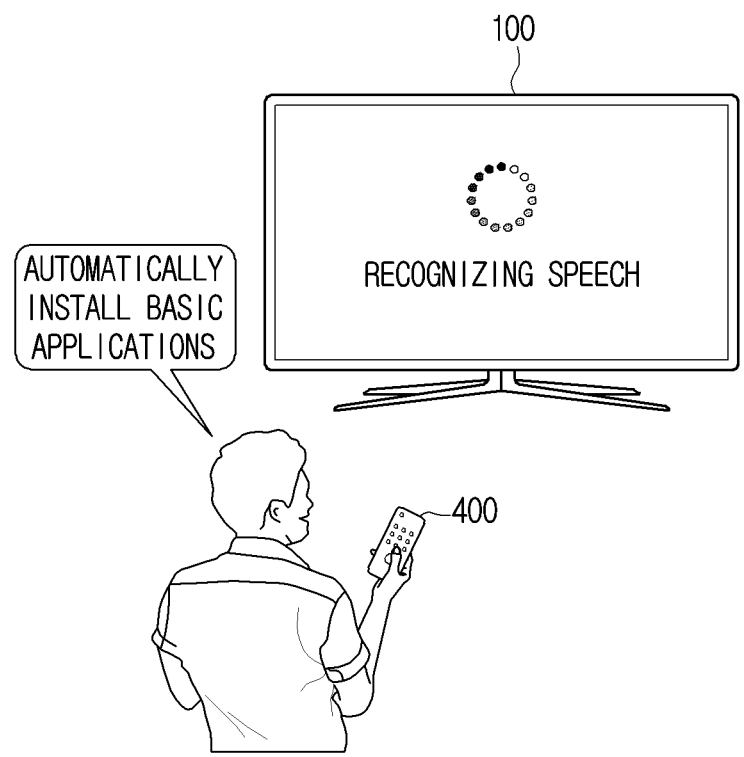
FIG. 5 is a diagram of a first example embodiment related to a method by which the user command is received according to an embodiment of the disclosure.
Figure 6:
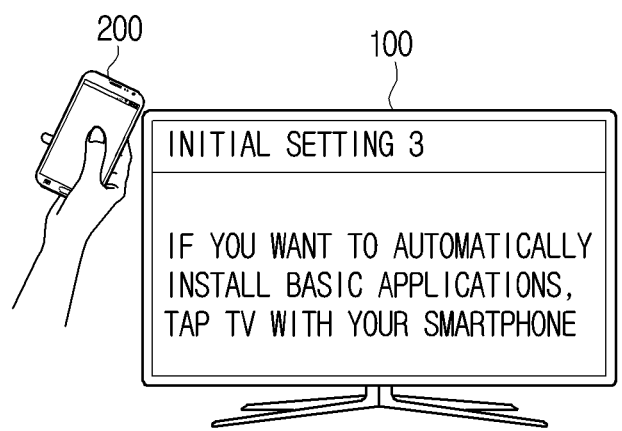
FIG. 6 is a diagram of a second example embodiment related to the method by which the user command is received according to an embodiment of the disclosure.

FIGS. 5 and 6 are diagrams explaining various embodiments related to a method by which the user command is received according to an embodiment of the disclosure.

In some embodiments, the user command may be received based on a speech signal according to an utterance from the user. Referring to an example illustrated in FIG. 5, the user may utter a user speech such as "automatically install basic applications". Then, the processor 130 may receive the speech signal corresponding to the user speech through the microphone included in the electronic device 100. For example, the microphone may include an analog-to-digital (A/D) converter, and the processor 130 may receive the speech signal converted into a digital signal through the A/D converter. In some embodiments, the processor 130 may acquire text information corresponding to the received speech signal using a neural network model. Alternatively or additionally, the processor 130 may identify a user command corresponding to the text information.

For example, the neural network model may refer to a neural network model trained to output the text information corresponding to the input speech signal, and may be referred to as an automatic speech recognition (ASR) model. In some embodiments, the neural network model may be included in the electronic device 100 in an on-device type. Alternatively or additionally, the neural network model may be included in an external device and/or an external server connected to the electronic device 100.

In some embodiments, the external server that includes the neural network model for speech recognition may serve as a speech-to-text (STT) server converting the received speech signal into text information corresponding thereto, and/or may serve as a main server performing various functions such as processing the text information as well as the STT server. Alternatively or additionally, the data processed by the external server may be transmitted to the electronic device 100 and/or may be transmitted to another server for processing.

In other embodiments, if or when the text information corresponding to the speech signal is acquired by the electronic device 100 and/or the text information acquired by the external server is transmitted to the electronic device 100, the electronic device 100 may perform a function corresponding to the received text information, and/or may transmit the received text information to another external server and perform a specific function based on data transmitted back to the electronic device 100 after being processed by the another external server.

In some embodiments, the speech signal corresponding to the user speech may be received through the microphone included in the electronic device 100. Alternatively or additionally, the speech signal corresponding to the user speech may be received through a microphone of an external device included by the remote control device (e.g., remote control) or by the user terminal 200 as illustrated in FIG. 5. In some embodiments, the processor 130 may acquire the speech signal by receiving the speech signal from the external device through the communication interface 110 if or when the speech signal corresponding to the user speech is received through the microphone included in the external device. In such embodiments, the processor 130 may perform speech recognition on the speech signal received from the external device using the neural network model as described above, and, consequently, may identify a user command corresponding to the speech signal.

In some embodiments, the user command may be received based on a motion of the user. Referring to an example illustrated in FIG. 6, an initial setting screen of the electronic device 100 may include a guide message such as "if you want to automatically install basic applications, tap the TV with your smartphone". While the guide message is displayed, the user may tap one of the corners of the electronic device 100 with the user terminal 200 (smartphone). The processor 130 may detect the above-described tap motion through a gyro sensor or the like included in the electronic device 100. When the above-described tap motion is detected, the processor 130 may process the detected tap motion as receiving a user command for installing one or more applications on the electronic device 100.

Figure 7:
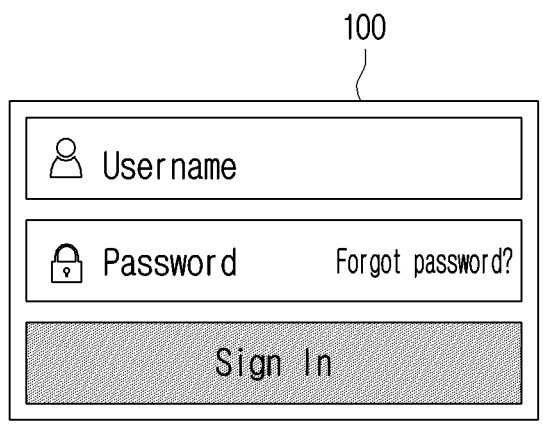
FIG. 7 is a diagram illustrating a first embodiment related to a method for receiving user account information from the user terminal.
Figure 8:
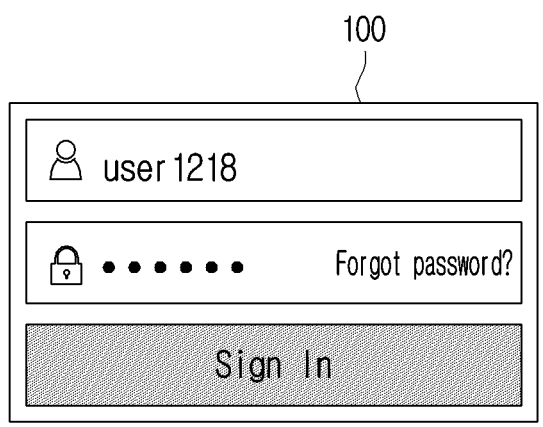
FIG. 8 is a diagram illustrating a second embodiment related to the method for receiving user account information from the user terminal.

FIGS. 7 and 8 are diagrams explaining embodiments related to a method for receiving user account information from the user terminal 200.

In some embodiments, the processor 130 may receive, from the user terminal 200 through the communication interface 110, user account information for the first application installed on the user terminal 200 that has been identified among the one or more applications identified by the electronic device 100, as described above in reference to FIG. 3.

The processor 130 may identify whether or not log-in request information is included on a screen for the first application, when the user account information for the first application has been received from the user terminal 200, for example.

That is, the processor 130 may identify whether or not the log-in request information is included on the screen for the first application based on whether or not the information displayed on the screen for the first application includes information regarding a user ID and a password as illustrated in FIG. 7 (e.g., username and password in FIG. 7) and/or whether or not the information regarding the user ID and the password is maintained for a predetermined time.

In some embodiments, the processor 130 may include a display module and/or a frame rate control (FRC) module configured to identify whether or not the information displayed on the screen for the first application includes information regarding a user ID and a password. Alternatively or additionally, the identifying may include determining whether or not the information regarding the user ID and the password has been maintained for a predetermined time, which may be identified by detecting a frame-by-frame change on the screen for the first application through the FRC module.

In response to identifying that the log-in request information has been included on the screen for the first application, the processor 130 may automatically input the user ID and the password included in the user account information into an ID input field and a password input field included on the screen for the first application, respectively. At this time, the processor 130 may perform processing to prevent the display of at least part of the user ID and of the password on the display of the electronic device 100 and/or the user terminal 200.

For example, as illustrated in FIG. 8, the processor 130 may perform processing to input the user ID into the ID input field included on the screen for the first application and to display the user ID in the ID input field. The processor 130 may perform processing to input the password into the password input field included on the screen for the first application and to prevent the display of the password in the password input field.

Figure 9:
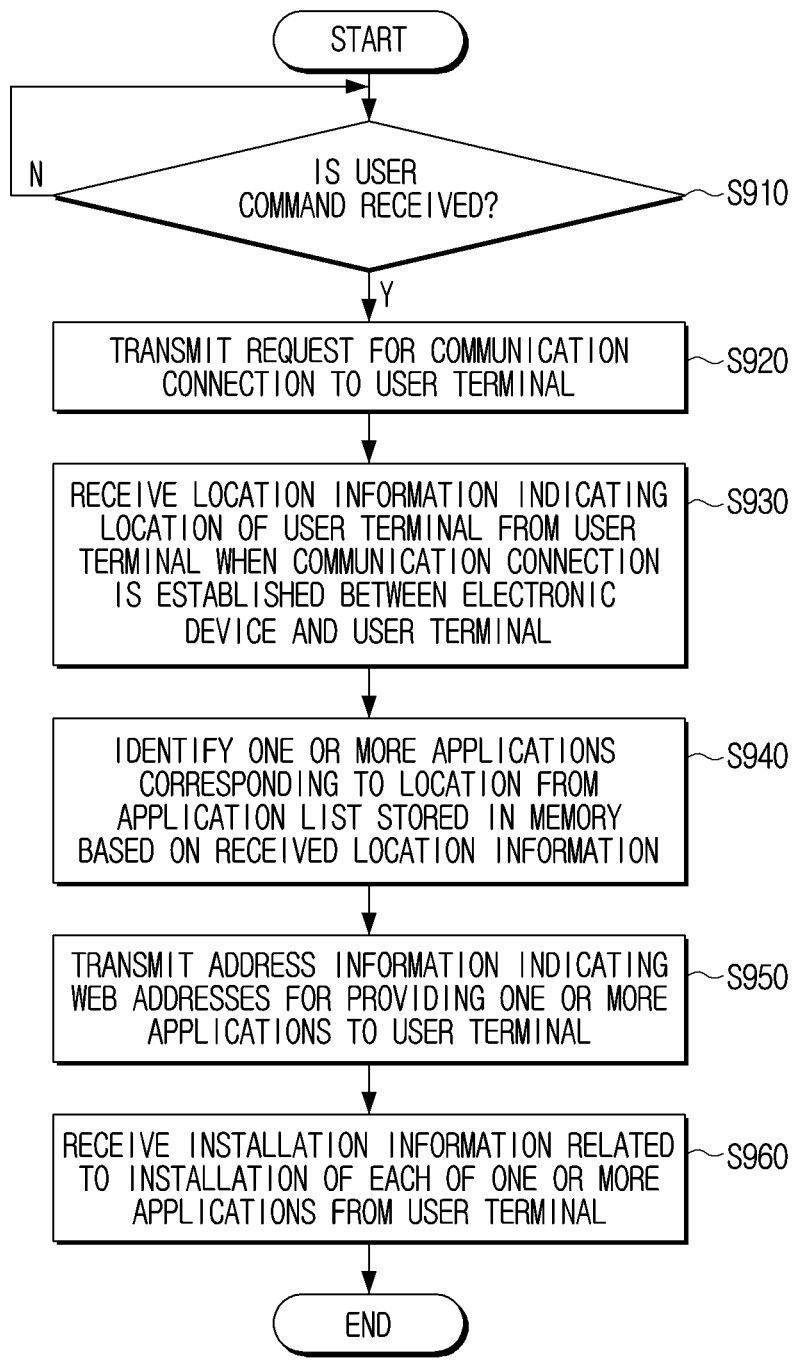
FIG. 9 is a flowchart illustrating a controlling method of the electronic device according to an embodiment of the disclosure.

FIG. 9 is a flowchart illustrating a controlling method of the electronic device 100 according to an embodiment of the disclosure.

As illustrated in FIG. 9, the electronic device 100 may receive a user command (S910). The user command may be a command for installing one or more applications on the electronic device 100.

When the user command is received, the electronic device 100 may transmit a request for communication connection to the user terminal 200 (S920). The communication connection may refer to a one-to-one communication connection between the electronic device 100 and the user terminal 200. In some embodiments, the one-to-one communication connection between the electronic device 100 and the user terminal 200 may be a Wi-Fi direct connection.

When the communication connection is established between the electronic device 100 and the user terminal 200, the electronic device 100 may receive location information from the user terminal 200 (S930). Accordingly, the electronic device 100 may identify a location of the user terminal 200, thereby identifying a location of the electronic device 100 corresponding to the location of the user terminal 200, that is, a country or a region where the electronic device 100 is located.

The electronic device 100 may identify one or more applications corresponding to the location from an application list previously stored in the electronic device 100 based on the received location information (S940). The application list may include information regarding applications corresponding to each of a plurality of locations that are applications that have been previously evaluated (e.g., by a developer) as being necessary in the corresponding location and/or applications that have been previously evaluated as being highly preferred by users in the corresponding location.

The electronic device 100 may transmit address information indicating web addresses for providing the one or more applications to the user terminal 200 (S950). The address information may be information indicating a web address for providing each of the applications. In some embodiments, the address information may include URL address information for each website directly indicating the web address and/or separate data enabling access to a specific website or an application store.

The electronic device 100 may receive installation information related to installation of each of the one or more applications from the user terminal 200 (S960). When at least one application installed on the user terminal 200 is included in the one or more applications identified by the electronic device 100, the electronic device 100 may receive at least one of user account information and environment setting information for each of the at least one application from the user terminal 200.

The electronic device 100 may install each of the one or more applications based on the received installation information, log in to the first application based on the received user account information, and set user environments for the first application based on the received environment setting information.

Although the controlling method of the electronic device 100 according to an embodiment of the disclosure has been briefly described with reference to FIG. 9, the various embodiments related to the control process of the processor 130 may be applied to the controlling method of the electronic device 100 as well.

The controlling method of the electronic device 100 according to the above-described embodiments may be implemented as a program, and the program may be provided to the electronic device 100. For example, the program including the controlling method of the electronic device 100 may be stored in a non-transitory computer-readable medium for provision.

For example, the non-transitory computer-readable recording medium containing the program for executing the controlling method of the electronic device 100, the controlling method of the electronic device 100 includes: transmitting a request for communication connection to the user terminal 200 when a user command is received; receiving location information indicating a location of the user terminal 200 from the user terminal 200 when the communication connection is established between the electronic device 100 and the user terminal 200 based on the request; identifying one or more applications corresponding to the location from an application list stored in the memory 120 based on the received location information; transmitting address information indicating web addresses for providing the one or more applications to the user terminal 200; and receiving installation information related to installation of each of the one or more applications from the user terminal 200.

The non-transitory computer-readable medium may be a medium that stores data semi-permanently and that is machine-readable, rather than a medium that stores data for a short moment, such as a register, a cache, or the memory 120, for example. In some embodiments, the above-described various applications or programs may be stored in a non-transitory computer readable medium such as a CD, a DVD, a hard disk, a Blu-ray disk, a USB, a memory card, a ROM, or the like for provision.

Although the controlling method of the electronic device 100 and the computer-readable recording medium containing the program for executing the controlling method of the electronic device 100 have been briefly described above, this is merely for omitting redundant description, and the various embodiments of the electronic device 100 may, of course, be applied to the controlling method of the electronic device 100 and the computer-readable recording medium containing the program for executing the controlling method of the electronic device 100 as well.

According to the above-described various embodiments of the disclosure, the electronic device 100 can install applications in an efficient manner by receiving installation information regarding the applications from the user terminal 200 without requiring connection to the wired or wireless network through the AP or the like.

In some embodiments, when basic applications to be installed on the electronic device 100 differ by country or by region, the electronic device 100 may automatically install the applications suitable for the country or region without having a need for GPS module, and without a need for the electronic device 100 to be connected to a wired network or a wireless network, with no user input for the location of the electronic device 100.

In other embodiments, the electronic device 100 may receive the installation information for the applications and/or the user account information and the environment setting information for the applications from the user terminal 200, thereby significantly improving user convenience in logging in to the applications and setting environments.

The machine-readable storage medium may be provided in the form of a non-transitory storage medium. The non-transitory storage medium may be a storage medium that is a tangible device, and does not include a signal (e.g., electromagnetic wave), but this term does not differentiate a case where data is semi-permanently stored in the storage medium from a case where data is temporarily stored in the storage medium. As an example, the non-transitory storage medium may include a buffer in which data is temporarily stored.

According to an embodiment, the method according to the various embodiments disclosed herein may be included in a computer program product for provision. The computer program product may be traded as a product between a seller and a buyer. The computer program product may be distributed in the form of a machine-readable storage medium (e.g., compact disc read only memory (CD-ROM)), or may be distributed (e.g., downloaded or uploaded) online in a direct manner via an application store (e.g., PlayStore™) or between two user devices (e.g., smartphones). If the computer program product is distributed online, at least part of the computer program product (e.g., downloadable application) may be temporarily generated or at least temporarily stored in the machine-readable storage medium, such as a memory of a server of a manufacturer, a server of an application store, or a relay server.

According to various embodiments of the disclosure, each of the above-described components (e.g., module or program) may include a single entity or multiple entities. According to various embodiments, one or more of the above-described sub-components may be omitted, or another sub-component may be added. Alternatively or additionally, some components (e.g., modules or programs) may be integrated into a single entity. In this case, the integrated entity may perform the same or similar functions performed by the respective components before being integrated. According to various embodiments, operations performed by the modules, the programs, or other components may be executed sequentially, in parallel, repeatedly, or heuristically, or one or more of the operations may be executed in different sequences or omitted, or other operations may be added.

Meanwhile, the term "unit" or "module" used herein includes a unit configured in hardware, software, or firmware, and may interchangeably be used with the term "logic", "logic block", "part", "circuit", or the like. The "unit" or "module" may be an integrated part, or a minimum unit for performing one or more functions or a part thereof. For example, the module may be configured as an ASIC.

Various embodiments of the disclosure may be implemented as software including commands that are stored in the machine-readable storage medium (e.g., computer-readable storage medium). The machine is a device that invokes the stored command from the storage medium and is operable in accordance with the invoked command, and may include an electronic device (e.g., the electronic device 100) according to the embodiments disclosed herein.

If the command is executed by the processor, a function corresponding to the command may be performed either directly by the processor or using other components under the control of the processor. The commands may include codes generated or executed by a compiler or an interpreter.

Although the preferred embodiments of the disclosure have been illustrated and described above, the disclosure is not limited to the specific embodiments as described above, and various modification may be made by those skilled in the art without departing from the gist of the disclosure as claimed in the appended claims. Such modifications should not be individually understood from the technical spirit or prospect of the disclosure.

What is claimed is:

1. An electronic device comprising:
   a communication interface;
   a memory in which at least one instruction is stored; and
   a processor configured to execute the at least one instruction to:
   control the communication interface to transmit, to a user terminal, a request to establish a communication connection based on receiving a user command;
   receive, from the user terminal via the communication interface, location information indicating a location of the user terminal through the communication connection which is established between the electronic device and the user terminal based on the request;
   identify one or more applications corresponding to the location from an application list stored in the memory based on the location information;
   control the communication interface to transmit, to the user terminal, address information indicating web addresses for providing the one or more applications; and
   receive, from the user terminal through the communication interface, installation information related to installation of each of the one or more applications,
   wherein the installation information comprises information for installing each of the one or more applications in the electronic device, and
   wherein the installation information is transmitted from the user terminal to the electronic device after being transmitted from at least one server providing the installation information to the user terminal.

2. The electronic device of claim 1,
   wherein the processor is further configured to execute the at least one instruction to receive, from the user terminal through the communication interface, at least one of user account information and environment setting information for each of at least one application installed on the user terminal based on the at least one application installed on the user terminal being included in the one or more applications.

3. The electronic device of claim 2, wherein the processor is further configured to execute the at least one instruction to:
   execute a first application of the at least one application based on the installation information;
   log in to the first application based on the user account information, based on log-in request information being included on a screen for the first application; and
   set user environments for the first application based on the environment setting information.

4. The electronic device of claim 1, wherein the location of the user terminal is the same as a location of the electronic device, and
   wherein the location information includes at least one of information regarding a country in which the user terminal is located and information regarding a region in which the user terminal is located.

5. The electronic device of claim 1, wherein the communication connection is established based on the request and a response to the request received from the user terminal through the communication interface,
   wherein the communication connection is a Wireless-Fidelity (Wi-Fi) direct connection for one-to-one communication between the electronic device and the user terminal, and
   wherein the request and the response are transmitted and received through Bluetooth communication.

6. The electronic device of claim 1, wherein the processor is further configured to execute the at least one instruction to:
   terminate the communication connection in response to transmitting the address information to the user terminal; and
   recommence the communication connection in response to receiving the installation information from the user terminal.

7. The electronic device of claim 1, wherein the processor is further configured to execute the at least one instruction to:
   control the communication interface to transmit, to the user terminal, the address information for each of the one or more applications, based on a number of times that the electronic device has been booted being one; and control the communication interface to transmit, to the user terminal, the address information for each of the one or more applications other than an application installed on the electronic device among the one or more applications, based on the number of times that the electronic device has been booted being more than one.

8. The electronic device of claim 1, wherein the processor is further configured to execute the at least one instruction to transmit and receive the location information, the address information, and the installation information through the communication connection when the electronic device is in a state where the electronic device is not connected to a wired or wireless network for communication with a server.

9. The electronic device of claim 1, wherein the user command corresponds to a speech signal received through a microphone included in at least one of the electronic device, the user terminal, and a remote control device for controlling the electronic device.

10. The electronic device of claim 1, further comprising an input/output interface for inputting or outputting a video signal and an audio signal, and
wherein the processor is further configured to execute the at least one instruction to:
identify a location of the electronic device based on metadata included in a broadcast signal based on the broadcast signal being received through the input/output interface; and
identify the one or more applications corresponding to the identified location of the electronic device.

11. A method of controlling an electronic device, the method comprising:
transmitting, to a user terminal, a request to establish a communication connection based on a user command being received;
receiving, from the user terminal, location information indicating a location of the user terminal through the communication connection which is established between the electronic device and the user terminal based on the request;
identifying one or more applications corresponding to the location from an application list stored in a memory based on the location information;
transmitting, to the user terminal, address information indicating web addresses for providing the one or more applications; and
receiving, from the user terminal, installation information related to installation of each of the one or more applications,
wherein the installation information comprises information for installing each of the one or more applications in the electronic device, and
wherein the installation information is transmitted from the user terminal to the electronic device after being transmitted from at least one server providing the installation information to the user terminal.

12. The method of claim 11,
wherein the method further comprises receiving, from the user terminal, at least one of user account information and environment setting information for each of at least one application installed on the user terminal based on the at least one application installed on the user terminal being included in the one or more applications.

13. The method of claim 12, further comprising:
executing a first application of the at least one application based on the installation information;
logging in to the first application based on the user account information, based on log-in request information being included on a screen for the first application; and
setting user environments for the first application based on the environment setting information.

14. The method of claim 11, wherein the location of the user terminal is the same as a location of the electronic device, and
wherein the location information includes at least one of information regarding a country in which the user terminal is located and information regarding a region in which the user terminal is located.

15. The method of claim 11, wherein the communication connection is established based on the request and a response to the request received from the user terminal,
wherein the communication connection is a Wireless-Fidelity (Wi-Fi) direct connection for one-to-one communication between the electronic device and the user terminal, and
wherein the request and the response are transmitted and received through Bluetooth communication.

16. The method of claim 11, further comprising:
terminating the communication connection in response to transmitting the address information to the user terminal; and
recommencing the communication connection in response to receiving the installation information from the user terminal.

17. The method of claim 11, wherein the transmitting the address information comprises:
transmitting, to the user terminal, the address information for each of the one or more applications, based on a number of times that the electronic device has been booted being one; and
transmitting, to the user terminal, the address information for each of the one or more applications other than an application installed on the electronic device among the one or more applications, based on the number of times that the electronic device has been booted being more than one.

18. The method of claim 11, further comprising:
transmitting and receiving the location information, the address information, and the installation information through the communication connection when the electronic device is in a state where the electronic device is not connected to a wired or wireless network for communication with a server.

19. The method of claim 11, further comprising:
identifying a location of the electronic device based on metadata included in a broadcast signal; and
identifying the one or more applications corresponding to the location of the electronic device.

20. A non-transitory computer-readable recording medium containing a program that is executed by a processor to perform a method of controlling an electronic device, the method comprising:
transmitting, to a user terminal, a request for communication connection based on a user command being received;
receiving, from the user terminal, location information indicating a location of the user terminal through the communication connection which is established between the electronic device and the user terminal based on the request;

identifying one or more applications corresponding to the location from an application list stored in a memory based on the location information;
transmitting, to the user terminal, address information indicating web addresses for providing the one or more applications; and
receiving, from the user terminal, installation information related to installation of each of the one or more applications,
wherein the installation information comprises information for installing each of the one or more applications in the electronic device, and
wherein the installation information is transmitted from the user terminal to the electronic device after being transmitted from at least one server providing the installation information to the user terminal.

* * * * *